(12) United States Patent
Lading

(10) Patent No.: US 8,565,941 B2
(45) Date of Patent: Oct. 22, 2013

(54) METHOD FOR COMPENSATION OF GYROSCOPIC FORCES OF A ROTOR IN A HELICOPTER

(75) Inventor: Gert Lading, Randers (DK)

(73) Assignee: HeliScandia ApS, Randers SV (DK)

(*) Notice: Subject to any disclaimer, the term of this patent is extended or adjusted under 35 U.S.C. 154(b) by 161 days.

(21) Appl. No.: 13/318,484

(22) PCT Filed: May 5, 2010

(86) PCT No.: PCT/DK2010/050098
§ 371 (c)(1),
(2), (4) Date: Nov. 2, 2011

(87) PCT Pub. No.: WO2010/127675
PCT Pub. Date: Nov. 11, 2010

(65) Prior Publication Data
US 2012/0056031 A1 Mar. 8, 2012

(30) Foreign Application Priority Data
May 7, 2009 (DK) .................................. 2009 00596

(51) Int. Cl.
*G05D 3/00* (2006.01)
(52) U.S. Cl.
USPC .......................... 701/4; 244/17.25; 244/17.23
(58) Field of Classification Search
USPC .......................................... 244/17.25, 17.27
See application file for complete search history.

(56) References Cited

U.S. PATENT DOCUMENTS

| | | | | |
|---|---|---|---|---|
| 2,418,407 A * | 4/1947 | Hays | ........................... | 244/17.25 |
| 3,228,479 A * | 1/1966 | Nagler | ........................... | 416/149 |
| 3,489,018 A * | 1/1970 | Slivka | ............................. | 74/5.42 |
| 3,576,299 A * | 4/1971 | Hanson | ........................ | 244/17.19 |
| 3,765,622 A * | 10/1973 | Haines | ........................ | 244/17.11 |
| 5,507,453 A * | 4/1996 | Shapery | ........................ | 244/12.5 |
| 6,460,802 B1 * | 10/2002 | Norris | ........................ | 244/17.11 |
| 7,128,293 B2 * | 10/2006 | Isley | ........................... | 244/17.25 |
| 7,306,186 B2 * | 12/2007 | Kusic | ........................... | 244/17.23 |
| 7,753,310 B2 * | 7/2010 | Kusic | ........................... | 244/17.25 |
| 2004/0076518 A1 * | 4/2004 | Drake | ............................. | 416/10 |
| 2010/0260607 A1 * | 10/2010 | Lading | ........................ | 416/20 R |
| 2012/0312917 A1 * | 12/2012 | Kusic | ........................... | 244/17.25 |

FOREIGN PATENT DOCUMENTS

| | | |
|---|---|---|
| DE | 2209733 | 8/1973 |
| EP | 1832511 | 12/2007 |
| FR | 1424495 | 1/1966 |
| GB | 2375090 | 6/2002 |
| GB | 2436258 | 9/2007 |
| WO | 99/38769 | 8/1999 |
| WO | 2004/002824 | 1/2004 |
| WO | 2004/103814 | 12/2004 |
| WO | 2009/059608 | 5/2009 |
| WO | 2009059608 | 5/2009 |

* cited by examiner

*Primary Examiner* — Christopher P Ellis
*Assistant Examiner* — Medhat Badawi
(74) *Attorney, Agent, or Firm* — James Creighton Wray

(57) ABSTRACT

In order to suppress induction of precession when the rotor (24, 26) of a helicopter is tilted relative to a fuselage (31), the tilt trajectory is supplemented by transverse components. The helicopter is of the type with a bendable, actuated joint (34) between the rotor and a fuselage. A controller (2) receives an input signal (4) from a steering device (1) and transforms this input signal in an output signal (7) for an actuating system (3) for movement in the joint. The controller calculates on the basis of the input signal an estimation for further input signals, and adds a transverse component to the input trajectory before sending the output trajectory (11).

11 Claims, 8 Drawing Sheets

METHOD FOR COMPENSATION OF GYROSCOPIC FORCES OF A ROTOR IN A HELICOPTER

This application claims the benefit of Danish Application No. PA 2009 00596 filed May 7, 2009 and PCT/DK2010/050098 filed May 5, 2010, and the amended sheets, which are hereby incorporated by reference in their entirety as if fully set forth herein.

FIELD OF THE INVENTION

The present invention relates to a pitch and roll control method for a helicopter, the helicopter being of the type with a joint between the rotor and the fuselage, the joint being capable of pivotal movement in two transverse dimensions.

BACKGROUND OF THE INVENTION

Attitude control of a helicopter, e.g. banking, most often occurs by cyclic pitch control where the pitch angle of the rotary blade is continuously varied during the movement of the blade in the plane of rotation. However, this is mechanically a relatively complicated system and takes up substantial weight, which is a disadvantage, especially, for small helicopters. In addition, to control the yaw moment, a tail rotor is, normally, used, making the system even more complex. Therefore, for light-weight helicopters, different systems have been proposed.

In International patent application WO 99/38769, an unmanned helicopter is disclosed, where cyclic pitch control has been omitted as well as a tail rotor. The fuselage is connected to the rotor via a cardan-like joint for permitting limited tilting of the rotor relative to the fuselage in the roll and pitch direction.

In U.S. Pat. No. 7,128,293, a different pivot coupling between a cabin and a power unit with a rotor. The rotor can be moved forward and rearward by a trim actuator to trim the helicopter and it is tilted about pitch and roll axes by directional actuators for directional control.

In British patent application GB2375090 a three-leg suspension for the rotor is disclosed.

When a rotor is tilted relatively to a fuselage, the gyroscopic forces make control of pitch and roll of the helicopter difficult, especially, if the rotor is without cyclic pitch. For this reason, it has been proposed to use two counter-rotating rotors.

In U.S. Pat. No. 6,460,802, a helicopter with a double-rotor is disclosed. The double rotor is tiltable for controlling pitch and roll. A tiltable double rotor is also disclosed in International patent application WO 04/130814. International patent application WO 04/002824 discloses a helicopter with two tiltable rotors, one rotor provided on each end of the aircraft.

Especially for helicopters without cyclic pitch, any tilting of the rotor, especially if not a counter-rotating double-rotor, induces critical forces causing unstable pitch and roll of the aircraft. Precession induced by a tilting of the rotor is naturally damped due to the gravity forces on the aircraft. However, for large and fast tilting of the rotor, the resulting stronger gyroscopic forces on the aircraft with a corresponding precession may be fatal. It would be desirable to find an improved, simple, and light-weight solution in this respect.

OBJECTIVE OF THE INVENTION

It is the objective of the invention to provide a simple and light-weight solution for controlling the pitch and roll of an aircraft when a rotor is tilted. Especially, it is the purpose to find a simple solution which reduces the risk for precession.

DESCRIPTION OF THE INVENTION

This objective is achieved by method and a controller, as explained in the following, for controlling the pitch and roll of a helicopter. The helicopter has a fuselage, for example a cabin, and a rotor with wings above the fuselage.

The rotor has a rotor axis and is connected to the fuselage with a coupling capable of movement in two dimensions normal to the rotor axis. The movement can be only pivotal, for example by a cardan-type or gimbal-type coupling; or only translational, for example with a sliding arrangement; or a combination of both, for example with a tripod or a hexapod. Important is a movement of the centre of lift of the rotor relative to the centre of gravity of the fuselage in two dimensions normal to the rotor axis. For example, the tilting of the rotor relative to the vertical direction can be caused by a movement of, mainly, the fuselage whereas the rotor moves only little.

Typically, the coupling comprises an actuator system for adjusting the orientation of the rotor relative to the fuselage. In a practical embodiment, the rotor axis is provided on a support structure connected to the fuselage by an actuator driven coupling, which comprises an actuator system capable of moving the support structure with the rotor relative to the fuselage in two dimensions normal to the rotor axis.

The controller comprises an input channel for receiving input signals for changing the orientation of the rotor, or rather the support structure with the rotor, relative to a vertical direction. The vertical direction is the direction from the centre of gravity of the helicopter to the centre of gravity of the earth. The controller also has an output channel for sending output signals to the actuator system of the coupling for adjusting the orientation of the rotor, or rather the support structure with the rotor, relative to the fuselage from a start orientation on the basis of the input signals.

The controller is programmed for performing the following steps. The controller receives an input signal—for example from a joy-stick console—for tilting the rotor axis from the start orientation in a first tilting direction relative to the vertical direction. As a response to the input signal, the controller sends an output signal to the actuator system that starts a movement of the rotor axis, or rather the support structure with the rotor, in a direction substantially normal to the first direction and the rotor axis. The movement is a tilting or a translation or a combination of both. The movement of the rotor axis into the first direction is delayed to a substantial extent relative to the tilting in the substantially normal direction. In a practical embodiment, the movement is along a first part of a circular path in the direction of the rotation of the rotor.

Typically, the movement is done incrementally by a digital controller and is not an infinitely smooth movement. For example, an input command for tilting the rotor along a linear path in the first direction is converted into a movement starting with a substantially transverse direction following by a movement parallel to the first direction. The explanation for this movement is explained in the following.

It has been observed that a tilting of a rotating rotor in a single direction results in a precession of the system with a risk of losing the stability of the helicopter. This problem is mentioned in the above cited International patent application WO 04/103814 on page 4 third paragraph. What has been found experimentally in connection with the invention is the fact that this precession can be proactively precluded from the onset, if the input tilting force on the rotor is performed along a circular path in the direction of the rotation of the rotor, it will result in a linear tilt of the rotor without precession.

Thus, the invention proactively prevents precession, instead of post damping the precession.

For example, this preventing of the precession can be achieved with a pivotal movement by which the orientation of the fuselage is largely constant. However, if the coupling between the fuselage and the rotor, or rather the support structure with the rotor, is only of the translational type, precession can be prevented by a similar movement. The movement path defined by the output signal is slightly different for the translational movement than by the pivotal movement, however, the principle is similar.

In a further embodiment, the controller is configured for calculating a certain path in accordance with an algorithm, and a transformer after the controller is used to transform the output signal from the controller into control signals for the actually used coupling system. Thus, the same controller may be used for a translational system, a pivotal system, or a system like a hexapod capable of complex movements including tilting as well as translation. Only the transformer may be amended for adjusting the output signals.

The controller and the transformer are, typically, computers or computer software routines. However, it is also possible to apply a controller which is configured by analogue electronic components instead of a digital programming.

In connection with the invention, a controller has been built, which converts the input signal to an output signal taking into account the need for such compensation to preclude precession. If the input signal is a command for a tilting in a single direction, the compensating output signal, in some instances, would cause a movement roughly along a half-circle. In practice, however, the steering is rather such that it continuously shifts in direction and speed. Thus, the controller takes the first input signal and calculates a transverse movement first and introduces the movement in the first direction with a certain delay, such that the tilting is performed along the first part of a circular path. Afterwards, this path is corrected in accordance with an algorithm explained in more detail in the following.

For example, the input signal may come from a joy-stick type steering device, where a movement of the joy-stick creates a corresponding electric signal which is used as input signal for the controller. When the joy-stick starts to move from a first orientation, the electric signal generated by the joy-stick steering device and received as input signal by the controller is then used in the controller for an estimate of a possible final orientation of the joy-stick—the final orientation of the joy-stick corresponds to a final orientation of the rotor axis on the basis of the input signal and the start orientation. The initial estimate itself may appear to be entirely wrong as compared to the actual final position, but in practice it has been proven in an iterative process to work satisfactory and has the advantage of only a short, non-notable delay between the time of the input signal and the tilting of the rotor. A delay too long would be inappropriate for a steering that is performed continuously.

From the estimate of the final orientation, the controller calculates a substantially circular path from the start orientation to the estimated final orientation, the circular path being normal to the rotor axis. On the basis of this circular path, an output signal is sent for tilting and/or translating the rotor along a first part of the circular path.

Only in the case, where the speed of the movement of the joy-stick is constant, the tilting would continue along this firstly calculated circular path. In order to take into account also other types of varying input signals, the controller adjusts the calculated path continuously by performing new estimations upon receipt of further input signals.

On the basis of the varying input signals, an expected final orientation is continuously re-calculated, and, correspondingly, an adjustment of the previously calculated path is determined. In line with the continuously re-calculated path, an output signal is sent to the actuator system for tilting and/or translating the rotor relatively to the fuselage along the recalculated path.

The calculation can be performed in analogue electronic ways, however, digital methods are preferred in order to implement it as a digital computer program. Thus, in a practical embodiment, the controller is programmed for sampling the input signal into samples pertaining to consecutive time units. For example, for each consecutive time unit, data indicative for the orientation of the rotor axis in this time unit, data indicative for the average speed on the tilting of the rotor axis in the time unit, and data indicative for the average acceleration of the tilting of the rotor axis in the time unit are calculated. On the basis of the sampling, an output signal is created by the controller for the tilting of the rotor axis.

In a practical embodiment, the output signal has a first component and a second component for each specific input sample. The first component determines a first movement, for example tilt, of the rotor axis in the first direction, and the second component being a second movement, for example tilt, of the rotor axis in a direction normal to the first direction. The first component is delayed a plurality of time units relatively to the second component. In practice, on the basis of the input signal, the movement in the first direction as pertaining from a specific sample is parted up into a number of components along the first direction. These components are then distributed into the following time units. For example, 10% of the signal in a sample in used for movement on the first direction in the first following output sample, 20% in the next following output sample, 30% three time units later, and 40% four time units later. Thus, the tilting starts in a direction substantially normal to the first direction, and the movement in the first direction is performed to a large degree in latertime units. This emulates the first part of a circular movement.

In line with increasing tilting speed, the precession forces increase. In order to preclude this precession, the amplitude of the transverse movement has to be adjusted. For this reason, this transverse tilting amplitude is made dependent on the velocity and/or acceleration of the tilting of the rotor axis in the first direction, where the velocity or the acceleration or both are taken from at least one preceding sample. Thus, the transverse component in a time unit depends on the speed and acceleration of the steering system from earlier time units.

It should be pointed out that the term "first direction" is not a static direction but may change according to the use of the steering mechanism. This is the reason for the continuous estimation by the controller taking into account any arbitrary movement and finding the corresponding adjustment curves for the movement in the coupling between the rotor and the fuselage.

By using the system above, precession has been largely avoided in experimental setups. Basically, it has been found as being best if the movement amplitude normal to the first direction is dependent on the velocity of the preceding sample. Experimentally, it has been proven further advantageous, if the movement amplitude normal to the first direction is also dependent on the acceleration in a sample several time units earlier, preferably three time units earlier.

A controller of this type is especially useful for a helicopter comprising a fuselage and a single rotor with wings having constant pitch or collective pitch, where all the main rotor blades collectively (i.e. all at the same time) and independently of their position in contrast to cyclic pitch. Especially rotors not having cyclic pitch control are difficult to steer. The rotor has a rotor axis and is connected to the fuselage with a coupling that is capable for pivotal movement in two dimensions normal to the rotor axis. This pivotal movement is achieved with an actuator system for adjusting the orientation of the rotor relative to the fuselage. Preferably, the coupling is a hexapod.

The controller is suitable for helicopters having a rotor without cyclic pitch, with or without a tail rotor. The controller is suitable for helicopters having collective pitch control (not cyclic pitch control) with or without a tail rotor.

The coupling capable of pivotal movement between the rotor and the fuselage can be of varying types, for example a cardan-type or a tripod type. However, for combined translational and pivotal movement, a hexapod is preferred, the hexapod being a six-legged suspension connecting the support structure of the rotor with the fuselage. This kind of suspension was invented by V. Gough in 1955. The six legs are longitudinally extendable actuators which provide six-axis freedom for the rotor system in relation to the aircraft fuselage.

A hexapod as a coupling between a rotor and a fuselage provides the possibility of simplified fixed pitch angle for the rotor blade parts, and the resulting lifting force from the rotary wing may be regulated by the rotational speed. This entails a substantial simplification of the rotary wing, as there is no need for a complex collective- and cyclic pitch control mechanism.

The six-legged suspension at the rotor system also incorporates a built-in redundancy in case of actuator failure. A regulator may compensate for a failing actuator by calculating an alternative setting for the functioning actuators. This results in a situation where the rotary wing assumes an alternative level relative to the aircraft fuselage, which is without significance to airworthiness. By simultaneous failure of two actuators, it is still possible to manoeuvre the aircraft, however without trim.

The invention, especially in combination with a hexapod, may advantageously be combined with the principles of prior art helicopters having a pivotal joint between the rotor and the fuselage, for example the prior art helicopters as described above in the introduction to the invention. An independent part of the invention, therefore, is a helicopter with a fuselage and a rotor and with a hexapod connection between the fuselage and rotor. In a practical embodiment, the rotor is provided on support structure, and a hexapod connection is provided between the fuselage and the support structure. The hexapod connection is, advantageously, an actuator driven coupling with six actuator-driven legs.

For example, the rotor system of the helicopter is a self-driving autonomous system, where the rotor has a driving part with jet nozzles through which a jet stream is expelled to drive the rotor. Such systems are disclosed in French patent application FR 1 424 495, German Laid Open Document DE 2 209 733, European Patent Application EP 1 832 511, and International Patent Application WO 04/02824. However, a preferred system for the helicopter is described in co-pending International Patent Application PCT/DK2008/050268 by the same inventor When such autonomic rotor systems are suspended in a hexapod as described above, the system constitutes all control means of the aircraft, and the fuselage of the aircraft may be freely designed. The aircraft fuselage may be designed as a circular dome pointing in an arbitrary direction, independent of the flight direction. The aircraft may be an unmanned aircraft for military reconnaissance tasks. The dome may here be a sensor dome with optical sensors that may point in an arbitrary direction, independently of the flight direction. The dome may be a radar antenna and rotate with independent rotary speed.

The invention may be implemented in a computer program with the C-programming language. The corresponding iterative routine is copied in below.

```
C-Code start
void circular path( void) {
    // Pre Y input iterations
    Yv = Ycircleln - Yci_n_1; // calculates the velocity of Y
    Ya = Yv - Yv_n_1; // calculates the acceleration of Y
    // Y Output of Y input
    Yyf = Yv_n_1 * Kc1;
    Yyg = Yv_n_3 * Kc2;
    // X Output of Y input
    Xyu = ( Yv_n_1 * Kc3 + Ya * Kc4 ) * Kc5;
    Xyg = ( Xyu_n_1 - Xyg_n_1 + XyuR_n_1) * Kc6;
    XyuR = Xyu_n_1 - Xyg_n_1 + XyuR_n_1;
    // Post Y input iterations
    Yci_n_1 = Ycircleln; // stores Y-input n_1 position
    Yv_n_3 = Yv_n_2; // stores Y n_3 speed
    Yv_n_2 = Yv_n_1; // stores Y n_2 speed
    Yv_n_1 = Yv; // stores Y n_1 speed
    Xyu_n_1 = Xyu; // stores n_1 af X amplitude af Y input
    Xyg_n_1 = Xyg; // stores n_1 af X removal af Y input
    XyuR_n_1 = XyuR; // stores n_1 of X amplitude rest
    // Pre X input iterations
    Xv = Xcircleln - Xci_n_1; // calculates X speed
    Xa = Xv - Xv_n_1; // calculates X acceleration
    // X Output of X input
    Xxf = Xv_n_1 * Kc1;
    Xxg = Xv_n_3 * Kc2;
    // Y Output of X input
    Yxu = ( Xv_n_1 * Kc3 + Xa * Kc4 ) * Kc5;
    Yxg = ( Yxu_n_1 - Yxg_n_1 + YxuR_n_1) * Kc6;
    YxuR = Yxu_n_1 - Yxg_n_1 + YxuR_n_1;
    // Post X input iterations
    Xci_n_1 = Xcircleln; // stores X-input n_1 position
    Xv_n_3 = Xv_n_2; // stores X n_3 speed
    Xv_n_2 = Xv_n_1; // stores X n_2 speed
    Xv_n_1 = Xv; // stores X n_1 speed
    Yxu_n_1 = Yxu; // stores n_1 of Y amplitude of X input
    Yxg_n_1 = Yxg; // stores n_1 of Y removal of X input
    YxuR_n_1 = YxuR; // stores n_1 of Y amplitude rest
    // decomposition in a right hand and right rotating system
    YcircleOut = Yci_n_1 - Yyf + Yyg - Yxu + Yxg;
    XcircleOut = Xci_n_1 - Xxf + Xxg + Xyu - Xyg;
}// circular path
C-Code end
```

DETAILED DESCRIPTION OF THE INVENTION

Figure 1:
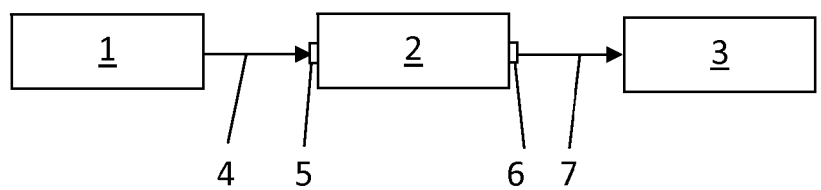
FIG. 1 a) is a sketch of the principle according to the invention, and b) is an extended sketch with a transformer.

FIG. 1*a* illustrates the principle of the invention. A steering device 1 sends 4 input signals through to the input channel 5 of the controller 2. The controller 2 is configured, for example programmed, to perform a calculation of the tilting path and sends 7 an output signal through the output channel 6 to the actuator system 3.

Figure 1B:
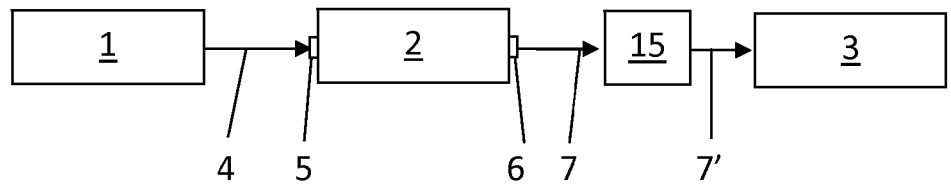

In order to adjust the output signal 7 to a signal 7' specific for the specific type of actuator, the controller 2 may be correspondingly configured. However, an alternative solution is illustrated in FIG. 1*b*, where the controller output signal 7 is transformed by a transformer 15 into a signal 7' for the correct path in accordance with the specific type of actuator. For example, the output signal 7 from the controller may be amended into a circular tilting, if the coupling is a pivotal coupling, or into a circular translation, if the coupling is a translational sliding arrangement, or into either of these or into a combination of the tilting and translation in the case that the coupling is a hexapod.

Figure 2:
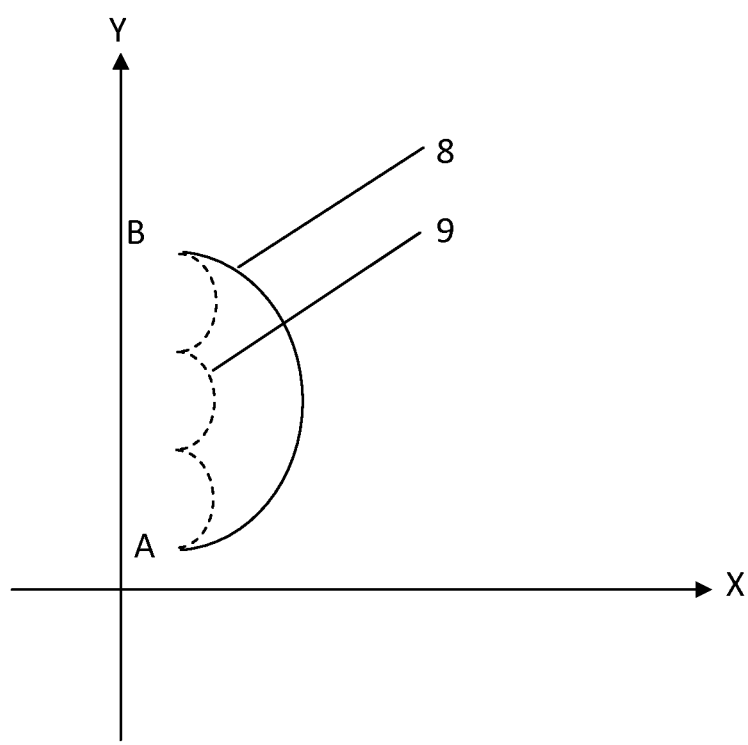
FIG. 2 illustrates the tilting movement of the rotor axis according to the algorithm by the controller.

FIG. 2 illustrates the movement of the rotor as given by the output signals from the controller. The definitions of the axes are X in the forward (pitching) direction of the aircraft and Y to the left (rolling) of the aircraft. The coordinate system in the drawing illustrates a movement from start orientation A of the rotor axis to final position B in a first direction, which is to the left of the forward direction. If the movement is performed with substantially constant speed along the linear path (the first direction) from A to B, there would be induced precession of the rotor, which could lead to problems of the aircraft. If the trajectory as determined by the controller, the linear input path from the steering apparatus, for example a joystick steering console, is converted into a circular path 8 as illustrated. The circular path suppresses the precession from the onset.

If the movement from the A orientation of the rotor axis to the B orientation of the rotor axis is performed slowly, the actual calculated movement may be a number of small half circles 9 instead of the large circle, as the precession is smaller in line with the slow movement. Slow changes of the rotor orientation are, typically, damped out quickly by the helicopter due to natural stability.

Figure 3:
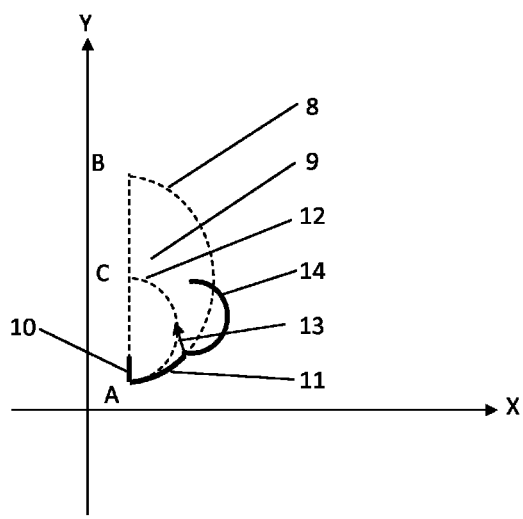
FIG. 3 illustrates the movement of a more complex situation.

Once a start input trajectory 10 from start orientation A in the first direction (Y-axis) is received by the controller as input signal from the steering device, movement of the forces on the rotor axis is started from A along the output trajectory 11, which is illustrated in FIG. 3. The controller receives- the start input trajectory as data indicative of the start position, the start velocity and the start acceleration. From these parameters, estimation is performed by the controller, such that an estimated final position B is calculated and the corresponding half-circular path 8. As a result, the first part 11 of the trajectory 8 is sent as output signal to the actuator system.

As the final orientation B is only an estimate, the controller, typically, would have to re-estimate the final orientation B on the basis of further input from the steering device. For example, the steering device may send a command to stop the movement at C. If the controller had used this as estimation, the circular path would have been as illustrated by the smaller half circle 12. Thus, for the controller, it is necessary to perform a correction of the path from the first trajectory 11 towards the smaller circle 12. Such a correction 13 is performed by calculating a new circular movement 14, as illustrated and preceding with a number of consecutive circular paths.

The sketch in FIG. 3 is only illustrative for the understanding of the principles and do not show actual paths for the movement, as the quick sampling of the system, for example with 50 sampling per second, typically, result in more complex curves than illustrated.

For more complex steering orders also including shifting directions and velocities, the trajectory has to be re-calculated continuously. However, the principle is applicable for each consecutive step. Mainly, the transverse direction of the start of the movement of the rotor axis is only normal to the first direction at the start of the movement. In later corrections, the adjustment need not be transverse to the movement, as this depends on the foregoing steps. For example, if the first transverse part of the curve has been calculated as larger than necessary to counteract the precession, following corrections may not immediately result in only mainly transverse movement but in more complicated paths.

An algorithm suitable for the invention is described below in schematic form

Figure 4:
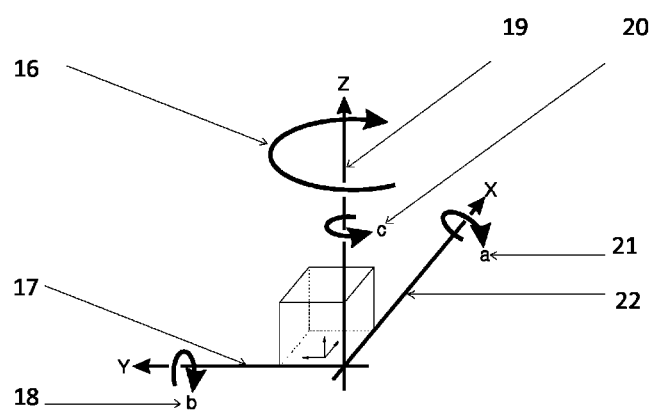
FIG. 4 shows the coordinate system for the algorithm.

When taking offset in a Cartesian coordinate system as illustrated in FIG. 4, the following algorithm can as an example be used for a one dimensional steering input action in direction of the Y-axis 17, transversely to the direction of flying in the X-direction 22 normal to the upward z-direction 19. Further indicated are the yaw 16, the roll 21, and the fuselage pitch 18. The output signal has a Y-component and an X-component starting off in a direction roughly along a circle. The Y-component can be regarded as a delayed Y signal distributed into some following samples, and the X-signal dominates the start of the movement.

$$Y\text{-component of } Y_{in} => \div Y_{delay} + Y_{restoration} \text{ and}$$
$$X\text{-komponent of } Y_{in} => X_{swing} + X_{withdraw}$$

where $$Y_{delay}\ Yy_d = Yv_{n-1} * K1 \text{ (read } Yyf\text{: Y-out, of } y\text{-input, delay portion)}$$

$$Y_{restoration}\ Yy_r = Yv_{n-3} * K2$$

$$X_{swing} Xy_s = (Yv_{n-1} * K3 + Ya_n * K4) * K5$$

$$X_{withdraw} Xy_w = (Xy_{sn-1} + X_{Ywn-1} + Xy_{sResm-1}) * K6$$

$$Xy_{sRest} = Xy_{sRest} = Xy_{sn-1} + Xy_{wn-1} + Xy_{sRest\ n-1}$$

where Yv is Yin velocity, $$Yv = Y_n + Y_{n-1}\ (dt \text{ is one sampling period})$$

and Ya is the acceleration of Yin, $$Ya = Yv_n + Yv_{n-1}\ (dt \text{ is one sampling period})$$

$K_n$ are constants and $_{n-1}$ is the iteration generationen.

$$Y_{y\text{-}input} = \div Yv_{n-1} * K1 + Yv_{n-3} * K2$$

$$X_{y\text{-}input} = (Yv_{n-1} * K3 + Ya_n * K4) * K5 \div (Xy_{sn-1} + Xy_{wn-1} + Xy_{sResm-1}) * K6$$

In the same way may X-input be developed:

$$x_{x\text{-}input} = \div Xv_{n-1} * K1 + Xv_{n-3} * K2$$

$$y_{x\text{-}input} = \div (Xv_{n-1} * K3 + Xa_n * K4) * K5 + (Yx_{sn-1} + Yx_{wn-1} + Yx_{sResm-1}) * K6$$

Note that positive x-input gives negative Y-circleswing in a righthand and CCW rotating system!

$$Y_{out}=Y_{n-1} \div Yv_{n-1}*K1+Yv_{n-3}*K2 \div (Xv_{n-1}*K3+Xa_n*K4)$$
$$*K5 \div (Yx_{sn-1} \div Yx_{wn-1}+Yx_{sRestn-1})*K6$$

$$X_{out}=X_{n-1}=Xv_{n-1}*K1+Xv_{n-3}*K2+(Yv_{n-1}*K3+Ya_n*K4)*K5 \div (Xu_{sn-1} \div Xy_{wn-1}+Xy_{sResm-1})*K6$$

The following constants are used:
K1=0.2 K2=0.7 K3=3.5 K4=1.5 K5=0.9 K6=0.08 og dt=20 ms In analogy, one can use a polar coordinate, in which case an exemplary algorithm takes the following form. In this case, the circular onset is along the A direction with a delayed B component.

B-komponent: $B_{in} = \div B_{delay} + B_{restoration}$ og A-komponent: $B_{in} = > A_{swing} \div A_{withdraw}$ hvor $B_{delay} Bb_f = Bv_{n-1}*K1$ (read Bbf: B-swing, of b-input, delay portion)

$B_{restoration} Bb_g = Bv_{n-3}*K2$ $A_{swing} Ab_u = (Bv_{n-1}*K3+Ba_n*K4)*K5$ $A_{withdraw} Ab_g = (Ab_{un-1} \div Ab_{gn-1}+Ab_{uRestn-1})*K6$ $Ab_{uRest} Ab_{uRest} = Ab_{un-1} \div Ab_{gn-1}+Ab_{uRestn-1}$ where By is B's velocity, $Bv=B_n \div B_{n-1}$ (dt is one sampling period)
and Ba er B's acceleration, $Ba=Bv_n \div Bv_{n-1}$ (dt is one sampling period)
$K_n$ are constants and $_{n-1}$ is the generation of the iterationen.

$B_{b-input}=Bv_{n-1}*K1+Bv_{n-3}*K2$ $A_{b-input}=(Bv_{n-1}*K3+Ba_n*K4)*K5 \div (Ab_{un-1} \div Ab_{gn-1}+Ab_{uRestn-1})*K6$ In the same way may A-input be developed:

$a_{a-input}= \div Av_{n-1}*K1+Av_{n-3}*K2$ $b_{a-input}= \div (Av_{n-1}*K3+Aa_n*K4)*K5+(Ba_{un-1} \div Ba_{gn-1}+Ba_{uRestn-1})*K6$ Note that positive A-swing gives negative B-circleswing in a righthand and righthand rotating system!

Figure 5A:
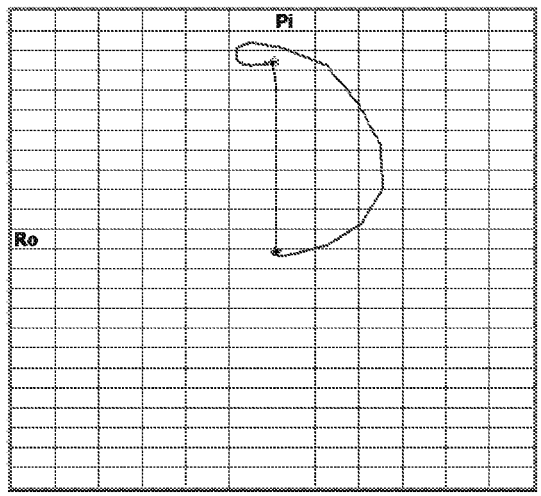
FIG. 5 a) and b) illustrate relationships between an input signal and the calculated path in the output signal.
Figure 5B:
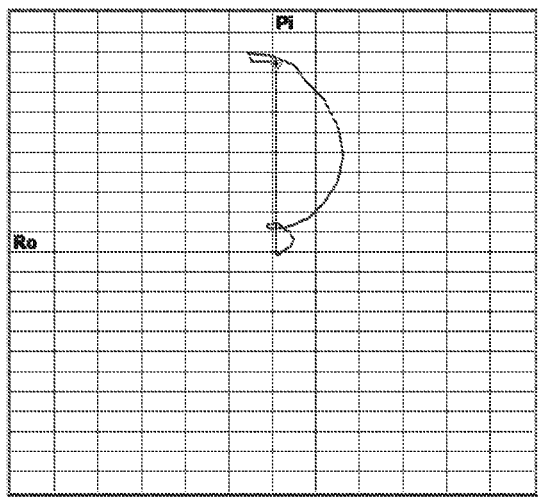
Figure 6A:
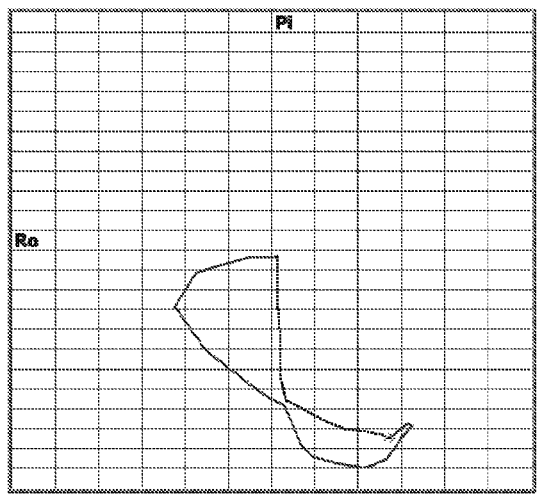
FIG. 6 a) and b) illustrate relationships between different input signals and the calculated paths in the output signals.
Figure 6B:
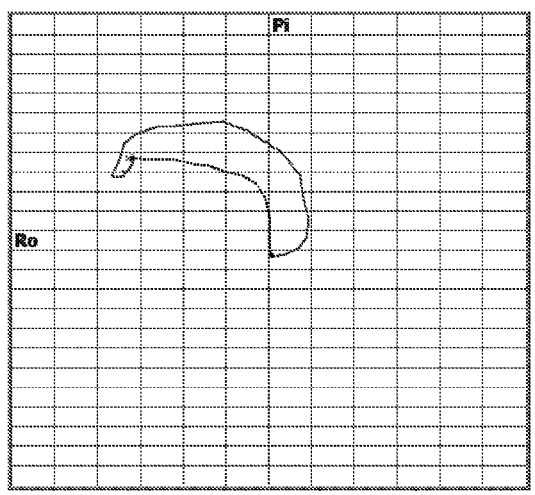

$B_{out}=B_{n-1} \div Bv_{n-1}*K1+Bv_{n-3}*K2 \div (Av_{n-1}*K3+Aa_n*K4)*K5+(Ba_{un-1} \div Ba_{gn-1}+Ba_{uRestn-1})*K6$ $A_{out}=A_{n-1} \div Av_{n-1}*K1+Av_{n-3}*K2+(Bv_{n-1}*K3+Ba_n*K4)*K5 \div (Ab_{un-1} \div Ab_{gn-1}+Ab_{uRestn-1})*K6$ The following onstants have been used with a sampling time unit of 20 ms
K1=0.2 K2=0.7 K3=3.5 K4=1.5 K5=0.9 K6=0.08 og dt=20 ms An example more complex movements and the corresponding calculated path is shown in FIGS. 5a and 5b, and in FIGS. 6a and 6b. The coordinate systems show the pitch direction as vertical and the roll direction as horizontal.

FIG. 5a shows a steady pitch input signal as a stipled linear line. The curved output signal illustrates the circular onset but then adjusts to the stopping of the movement by introducing a slight overshooting by bending around the end point.

In FIG. 5b, the same start and end position of the input signal is shown, however, with a starting slow speed and a continuing higher speed. The initial slow speed results in a small circular movement, after which a larger approximate circle takes into into account the higher acceleration and speed for the tilting.

FIG. 6a illustrates a steering input signal for a backwards tilt, that is a lift of the nose of the helicopter, with a following roll to starboard. Also, in this case, the approximation into substantial circular movements is illustrated, the circles of which, however, are largely distorted due to the shift in direction and speed.

FIG. 6b illustrates a combination of a forward pitch input signal followed by a roll part. The circular onset tries to follow the movement, resulting in continuous distortion of the circular path.

Figure 7:
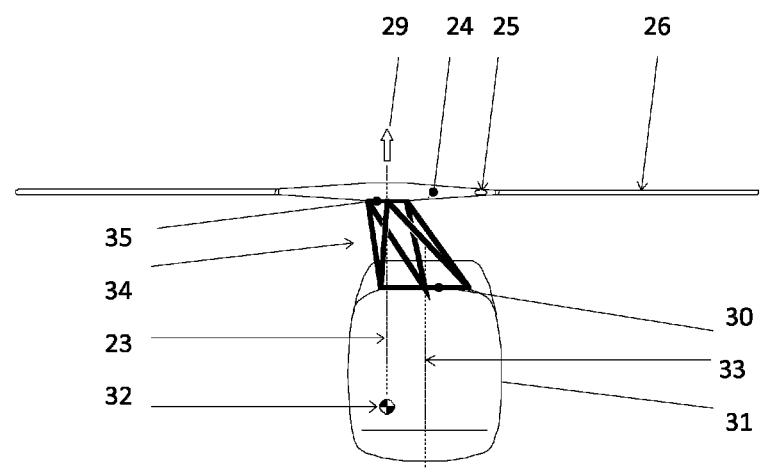
FIG. 7 shows a 6-leg suspension (hexapod) connecting the rotary wing and the aircraft fuselage to the attitude control of the aircraft.

FIG. 7 shows an exemplary embodiment of an aircraft 31 with a rotor system having a drive part 24 expelling gas tangentially from jet nozzles 25. Such systems are disclosed in French patent application FR 1 424 495, German Laid Open Document DE 2 209 733, European Patent Application EP 1 832 511, and International Patent Application WO 04/02824. However, a preferred system for the helicopter is described in copending International Patent Application PCT/DK2008/050268 by the same inventor.

The rotary blades 26 are fastened with a fixed pitch angle to the rotary structure of the drive part 24. The resulting lifting force 29 from the drive part 24 in combination with the blades 26 is regulated by the rotational speed of the rotary structure. This is in contrast to traditional helicopters, where the resulting force is regulated by the collective-pitch angle.

The attitude of the aircraft 31 is controlled by a 6-leg suspension 34, where the 6-legged suspension 34 is made as a hexapod interconnecting the support structure of the rotor system and the fuselage 31 of the aircraft. Thus, the six legs are connected to the drive part 24 at three points and to the fuselage 31 at three points such that each two adjacent legs have one common connection point at their one end and two different connection points at their opposite ends. The six legs 34 are longitudinally extendable actuators, where the reference triangle 30 is fastened to the fuselage 31 of the aircraft, and where the 6-axis freely movable triangle 35, shown in greater detail in FIG. 8, is fastened to the support structure of the drive part 24.

The situation in FIG. 7 is that the centre of gravity 32 of the aircraft fuselage is displaced 23 in relation to the vertical centre line 33 of the fuselage 31 of the aircraft, and where the suspension 34 of the aircraft has offset the rotor system laterally to a position directly above the centre of gravity 32, whereby the aircraft is in trim.

Figure 8:
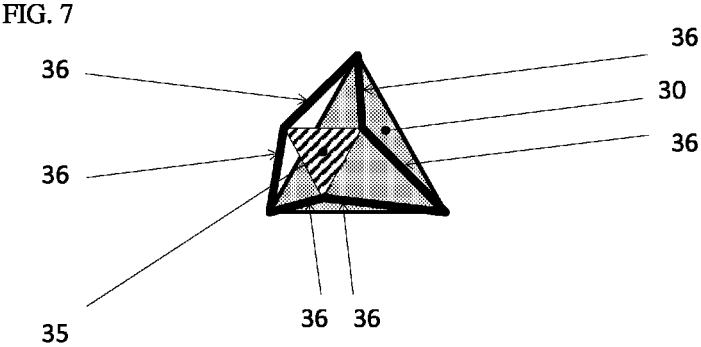
FIG. 8 shows a 6-leg suspension (hexapod) from a top view.

FIG. 8 shows the situation of FIG. 7 from a top view with the 6-axis freely movable triangle 35 displaced in relation to the reference triangle 30 by means of the six longitudinally extendable actuators 36.

Figure 9:
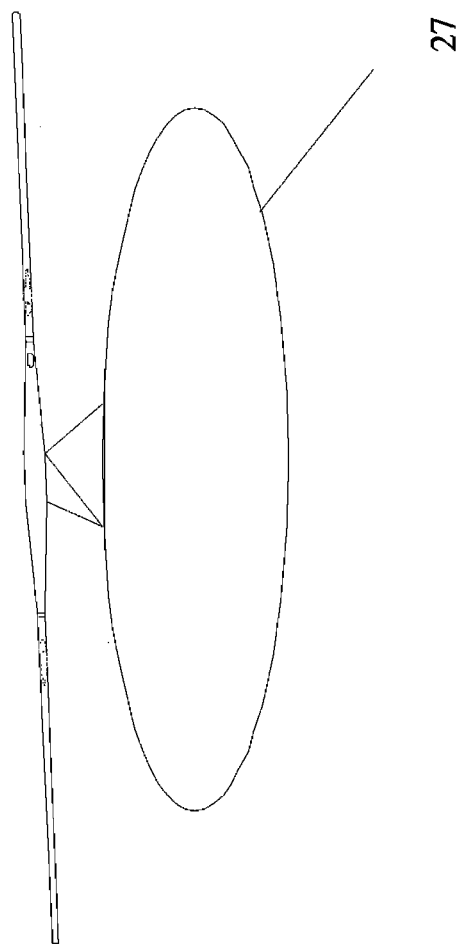
FIG. 9 shows an exemplary embodiment wherein the aircraft is designed as a circular sensor dome.

FIG. 9 shows the rotary wing mounted on an aircraft designed as a circular sensor dome 27, where the dome 27 may point in an arbitrary direction, independently of the flight direction. Also, the dome 27 may rotate horizontally around the centre of gravity of the dome 27 at an independent rotational speed.

Figure 10A:
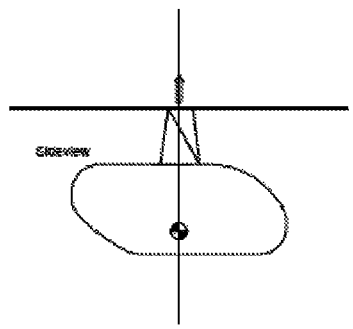
FIG. 10 illustrates a) the normal trim situation, b) the tilting of the rotor relative to the fuselage, and c) the tilting of the rotor relative to the vertical direction by also tilting the fuselage
Figure 10B:
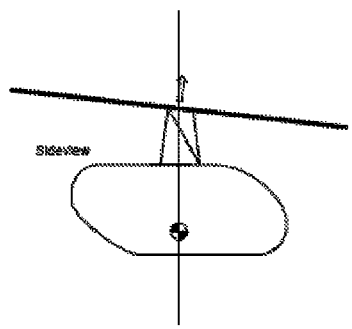
Figure 10C:
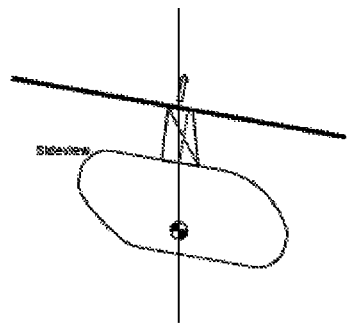

FIG. 10a illustrates the normal trim situation, where the rotor is vertically and along the vertical direction above the centre of gravity of the fuselage. FIG. 10b illustrates the tilting of the rotor relative to the fuselage. In this case, the hexapod could be substituted by a pivotal coupling. FIG. 10c illustrates the tilting of the rotor relative to the vertical direction by also tilting the fuselage. In this case, the hexapod could be substituted by a coupling only allowing lateral movements or a hexapod.

The invention claimed is:
1. A method for controlling the pitch and roll of a helicopter with a controller, wherein the helicopter comprises a fuselage (31) and a rotor (24, 26) with wings (26) above the fuselage, the rotor having a rotor axis and being provided on a support structure, the support structure being connected to the fuselage by an actuator driven coupling (34), the coupling comprising an actuator system (36) capable of moving the support structure with the rotor relative to the fuselage in two dimensions normal to the rotor axis for thereby from a start orientation causing a change of orientation of the support structure with the rotor relatively to a vertical direction (19), wherein the vertical direction is the direction from the centre of gravity of the helicopter to the centre of gravity of the earth, the controller (2) comprising an input channel (5) for receiving input signals (4) for changing the orientation of the support structure with the rotor relative to the vertical direction (19) and an output channel (6) for sending output signals (7) to the actuator system (36) for moving the support structure of the rotor relative to the fuselage on the basis of the input signals, the method comprising receiving by the controller the input signals for changing the orientation of the support structure with the rotor axis in a first tilting direction (17) relatively to the vertical direction, as a response to the input signal, sending an output signal to the actuator system (36)

as a response to the output signal, starting the actuator system to cause a movement of the support structure with the rotor relative to the fuselage in a direction (22) substantially normal to the first tilting direction and substantially normal to the rotor axis and along a first part of a circular path in the direction of the rotation of the rotor.

2. A method according to claim 1, wherein the movement substantially normal to the first direction (17) includes a tilting of the rotor axis relative to the fuselage.

3. A method according to claim 1, wherein the movement substantially normal to the first direction (17) includes a translation of the rotor relative to the fuselage.

4. A controller for a helicopter, the controller being programmed for performing a method according to claim 1, wherein the helicopter comprises a fuselage (31) and a rotor (24, 26) with wings (26) above the fuselage, the rotor having a rotor axis and being provided on a support structure, the support structure being connected to the fuselage by an actuator driven coupling (34), the coupling comprising an actuator system (36) capable of moving the support structure with the rotor relative to the fuselage in two dimensions normal to the rotor axis for thereby from a start orientation causing a change of orientation of the support structure with the rotor relatively to a vertical direction (19), wherein the vertical direction is the direction from the centre of gravity of the helicopter to the centre of gravity of the earth, the controller (2) comprising an input channel (5) for receiving input signals (4) for changing the orientation of the support structure with the rotor relative to the vertical direction (19) and an output channel (6) for sending output signals (7) to the actuator system (36) for moving the support structure of the rotor relative to the fuselage on the basis of the input signals, wherein the controller (2) is configured for on the basis of the input signal (4) and a start orientation (A), calculating an expected final orientation (B) of the rotor relative to the vertical direction, calculating a substantial circular path (8) from the start orientation to the final orientation, the circular path being substantially normal to the rotor axis, sending an output signal (7) for moving the support structure with the rotor relative to the fuselage along at least a first part (11) of the circular path.

5. A controller according to claim 4, wherein the controller (2) is configured for continuously receiving further input signals (4) for continuous change of orientation of the support structure with the rotor relatively to the vertical axis, on the basis of the input signals continuously re-calculating the expected final orientation, re-calculating an adjustment (13) of the previously calculated path, sending an output signal for moving the rotor relative to the fuselage along the recalculated path (14).

6. A controller according to claim 4, wherein the controller (2) is programmed for sampling the input signal (4) into samples pertaining to consecutive time units, on the basis of a specific sample of the input signal creating an output signal (7) for the change of orientation of the rotor axis relatively to the vertical axis, the output signal having a first component and a second component for each specific input sample, the first component determining a first movement of the rotor axis in the first direction, and the second component being a second movement of the rotor axis in a direction normal to the first direction, wherein the first component is delayed a plurality of time units relatively to the second component.

7. A controller according to claim 6, wherein the controller is programmed for for each sample determining a position, a velocity and an acceleration, wherein the second component implies a movement amplitude of the movement of the rotor normal to the first direction, the movement amplitude being dependent on the velocity or the acceleration or both of at least one preceding sample.

8. A controller according to claim 7, wherein the movement amplitude normal to the first direction is dependent on the velocity of the preceding sample.

9. A controller according to claim 7, wherein the movement amplitude normal to the first direction is dependent on the acceleration in a sample three time units earlier.

10. A helicopter with a controller (2) according to claim 4, wherein the helicopter comprises a fuselage (31) and a single rotor (24, 26) with wings (26) having constant pitch or having only collective pitch, the rotor having a rotor axis and being connected to the fuselage with an actuator (36) driven coupling (34) that is capable of movement in two dimensions normal to the rotor axis.

11. A helicopter according to claim 10, wherein the coupling is a hexapod (34).

\* \* \* \* \*